Jan. 20, 1953   F. A. SATTLER ET AL   2,626,223
SYNTHETIC RESIN AND INSULATED
PRODUCTS PRODUCED THEREWITH
Filed Oct. 17, 1951

Fig.1.

Reaction product of combined polyester-
amide and complex resinous epoxide.

Fig.2.

Glass fibers impregnated with
reaction product of combined
polyester-amide and complex
resinous epoxide.

Organopolysiloxane resin    Inorganic fibers

WITNESSES:
E. A. McCloskey
Mw. L. Groome

INVENTORS
Frank A. Sattler, Jack Swiss
and James G. Ford.
BY
Frederick Shapoe
ATTORNEY Patented Jan. 20, 1953

2,626,223

UNITED STATES PATENT OFFICE 2,626,223

SYNTHETIC RESIN AND INSULATED PRODUCTS PRODUCED THEREWITH

Frank A. Sattler, Pittsburgh, Jack Swiss, Murrysville, and James G. Ford, Sharon, Pa., assignors to Westinghouse Electric Corporation, East Pittsburgh, Pa., a corporation of Pennsylvania Application October 17, 1951, Serial No. 251,762

14 Claims. (Cl. 117—128.4)

This invention relates to synthetic copolymer resin compositions, and insulated wire and other products produced therewith.

This application is a continuation-in-part of our copending application Serial No. 169,231, filed June 20, 1950.

It is well known to those skilled in the art that the requirements imposed on enamel coatings on wire are so severe and critical that very few, if any, other applications for resinous materials set as high a standard. Enamel coatings on wire must be both tough and hard in order to withstand the severe mechanical abuse to which the wire is subjected in service. Thus coils are often wound from enameled wire under considerable pressure and at high speeds. The enamel must withstand the abrasion, the bending stresses and the heavy unit pressures encountered without disrupting from the wire or cracking. In many cases, the conductor is severely deformed beyond the elastic limit by such operations. Thus in automatic coil winding machines, such as are used in winding electric motors, enameled wire may be twisted, stretched and bent to such an extent that the copper wire may be elongated 10% and more. A good enamel coating on the wire must withstand this abuse without separating from the wire, breaking, or cracking.

After coils are wound, they may be baked at temperatures as high as 150° C. usually exposed to air during baking, and dipped in hot varnishes containing one or more of a variety of organic solvents while subjected to similar elevated temperatures. The enamel coating on wire must be resistant to the action of oils, greases, water, grit and dust and various atmospheres that may be encountered in industry. Motors for refrigerator service are usually immersed in a refrigerant which may comprise a halogenated liquid, such for example, as dichlorodifluoromethane, and oil. No appreciable dissolution of the enamel coating on the motor windings must take place under these conditions, otherwise the capillary openings through the refrigerant passes will clog and the apparatus will fail. It will be apparent that the physical and the chemical properties of the enamel must be outstanding.

Other further conditions must be met by a resinous composition before it can be considered entirely satisfactory for application to wire to provide an insulating enamel coating thereon. It must be capable of being dissolved in commercially available solvents to produce wire enamel solutions having a relatively high resin solids content without excessive viscosity. Wire enamels so prepared should exhibit stability in storage for long periods of time so that marked changes or precipitation do not occur. The wire enamel solutions when applied to wire should be capable of being satisfactorily baked or heat treated within a reasonably wide range of temperatures in the process of curing the resin composition on the wire. The applied baked coating of resin should be smooth and free from pinholes or other flaws. Furthermore, a thin coating of the cured enamel should possess a high dielectric strength and have desirable electrical insulating properties.

In evaluating coatings of enamel on a wire, the art has accepted certain tests as indicative of the merit of such enamels. A primary test employed by the art today is designated as the scrape value test. The scrape value indicates the relative hardness and toughness of an enamel. The scrape value is determined by passing the enameled wire under a loaded knife-edge, and increasing the load until it is sufficient to cause the knife-edge to cut through the enamel, this least load in ounces doing so is designated as the scrape value. It is believed that the scrape testing machine disclosed in C. B. Leape Patent 2,372,093, gives the most accurate scrape values of any device known at the present time, being reproducible to within one ounce. The scrape values indicated hereinafter have all been determined with this machine. It may be stated that any commercially usable enameled wire should have a scrape value of at least 15 ounces and preferably higher than 20 ounces for single thickness coating on size 20 wire and proportionate values for other wire sizes. Values of 30 ounces and higher for wire of the order of size 20 are exceptional.

The relative solvent and hot-varnish resistance of the enameled wire is indicated by the change in scrape value after subjecting an enameled wire to the action of various solvents for selected periods of time. Of two enamels the one that changes the least in scrape value after being immersed for 24 hours or more in a given solvent is stated to have the higher resistance to the solvent.

Other tests are usually applied to enameled wire to indicate certain other desirable characteristics. The "quick-jerk" test is applied to enameled wire by giving the wire a quick jerk to cause it to break. The enamel should be substantially continuous, without exhibiting cracks, up to the point of the break. This test indicates the adherence of the enamel to the wire as well as the elasticity of the enamel, both being desirable characteristics. The "heat-shock" test consists in winding a coil over a conical mandrel or a mandrel having various diameters, the smallest diameter being the same as the wire being tested, and placing the coil in an oven at elevated temperature. The smallest diameter mandrel that the wire can be wound on without cracking after placing in the oven is an indication of the relative abuse that the wire can stand in manufacture and service without failure. Electrical tests to indicate dielectric strength are employed to indicate the relative electrical insulating merits of the resin coatings.

The object of this invention is to provide a synthetic copolymer resin which when applied to wire produces insulating enamel coatings having outstanding physical and electrical properties.

Another object of this invention is to provide conductors insulated with a copolymer resin composition.

A still further object of the invention is to provide a process for producing copolymers of a polyester-amide and resinous epoxide.

Other objects of the invention will in part be obvious and will in part appear hereinafter.

For a fuller understanding of the nature and objects of the invention reference should be had to the following detailed description and drawing, in which.

We have discovered resinous compositions having outstanding physical and electrical properties, particularly for the preparation of enameled wire and similar insulated conductors, by copolymerizing certain polyester-amide resinous compositions and a resinous epoxide which is the polyether derivative of a polyhydric phenol. The copolymers have the properties required of the highest grade insulating wire enamels. Applying these copolymers we have prepared enameled wire of outstanding properties, which enameled wire has been found suitable for use under the extreme and diverse conditions met with in the electrical industry. Particular characteristics of the compositions will be disclosed hereinafter.

The resinous copolymer composition of the present invention is prepared by reacting (A) from 95 to 60 parts by weight of the specific polyester-amide reaction product to be detailed hereafter, such polyester-amide composition having a ball and ring softening temperature of not over 90° C., and (b) from 5 to 40 parts by weight of a resinous epoxide having a ball and ring softening temperature of from 40° C. to 140° C., and heating the mixture of (A) and (B) to react it to a copolymer or cocondensate having a ball and ring softening temperature of from 27° C. to 55° C. for a 70% solution of the copolymer in cresol.

The polyester-amide is prepared by admixing and heating to reaction the following:

(a) From 3 to 4.5 moles of at least one acidic compound selected from the group consisting of ethylenically unsaturated dicarboxylic acids and anhydrides thereof; examples thereof are maleic acid, maleic anhydride, citraconic acid, citraconic anhydride, aconitic acid, fumaric acid, 3,6-endomethylene-Δ-4-tetrahydrophthalic anhydride, dilinoleic acid and mixtures of two or more. The preparation of dilinoleic acid is set forth in an article beginning on page 65 of the March 1947 issue of the Journal of American Oil Chemists Society, vol. 24.

(b) From 0.5 to 2 moles of an acidic compound having no ethylenic unsaturation, selected from the group of aliphatic dicarboxylic acids and their anhydrides, having at least two non-carboxyl carbon atoms and having no other reactive groups than the carboxyl or anhydride groups; examples thereof are adipic acid, succinic acid, azelaic acid, diglycolic acid and sebacic acid; particularly good results follow in using compounds having from 2 to 8 non-carboxyl carbon atoms linked in a straight chain between terminal carboxyl groups.

(c) From 1.5 to 4.7 moles of an amine alcohol, the amine-alcohol comprising at least 75 mole percent of at least one primary amine-alcohol selected from the group consisting of monoethanolamine and monoisopropanolamine, and up to 25 mole percent may comprise diethanolamine or other secondary amine alcohol, no other reactive group than the amino group and the hydroxyl group being present.

(d) Up to 0.6 mole of a primary diamino compound; the primary diamino compound comprises at least one selected from the group consisting of ethylene diamine, propylene diamine, (1,3-propylene diamine, 1,2-propylene diamine) and urea; the sum of the moles of the amine-alcohol and the primary diamino compound equaling at least 2.2 and not exceeding 4.7.

(e) From 1 to 2.4 moles of at least one polyhydric alcohol, not more than 75 mole percent of the polyhydric alcohol having more than three reactive hydroxy groups. Examples of suitable polyhydric alcohols are glycerol, ethylene glycol, diethylene glycol, pentaerythritol 1,1,1-trimethylolpropane, 1,4-butanediol, 1,6-hexanediol, paraffinic glycols with up to 8 carbon atoms in a chain, and mixtures thereof. The hydroxyl groups are substantially the only reactive groups in these polyhydric alcohols.

Between 0.05 and 0.5 mole of an aliphatic unsaturated monocarboxylic fatty acid having from 16 to 18 carbon atoms in a chain terminating in the carboxyl group may be introduced and reacted simultaneously into the reaction product. Suitable fatty acids are tung oil fatty acids, linseed oil fatty acids, ricinoleic acid, oleic acid, linoleic acid and linolenic acid.

In reacting the components of the composition for producing a wire enamel for use in coating wire of all sizes, it is preferable that the proportions be so maintained that the carboxyl groups do not exceed at 10% stoichiometric excess over the combined alcohol and amine groups. A somewhat greater excess of total alcohol and amine groups can be tolerated, not to exceed a 20% stoichiometric excess over the carboxyl groups. In such proportioning, as is well known, an acid anhydride is equal to two carboxyl groups. If fine wire of a size equal to 24 A. W. G. and finer, is to be coated the acid can be present up to a stoichiometric excess of up to 15% and the amine and alcohols can be present up to a stoichiometric excess of 25%.

Highly satisfactory polyester-amide resins may be prepared by reacting the above components in the following four combinations and respective proportions:

1. 3.0 to 4.5 moles of unsaturated dicarboxylic acids or anhydrides
   0.5 to 2.0 moles of saturated dicarboxylic acids
   2.2 to 4.7 moles of primary alcohol-amine
   1 to 2.4 moles of polyhydric alcohol.
2. 3.0 to 4.5 moles of unsaturated dicarboxylic acids or anhydrides thereof
   0.5 to 2.0 moles of saturated dicarboxylic acids
   1.5 to 4.7 moles of primary amine-alcohol
   1 to 2.4 moles of polyhydric alcohol
   up to 0.6 mole of primary diamino compound, where the sum of the moles of primary amine-alcohol plus twice the moles of diamino compound does not exceed 4.7
3. 3.0 to 4.5 moles of unsaturated dicarboxylic acids or anhydrides
   0.5 to 2.0 moles of saturated dicarboxylic acids
   2.2 to 4.7 moles of primary alcohol-amine
   1 to 2.4 moles of polyhydric alcohol
   0.05 to 0.5 mole of unsaturated monocarboxylic fatty acid.
4. 3.0 to 4.5 moles of unsaturated dicarboxylic acids or anhydrides thereof
   0.5 to 2.0 moles of saturated dicarboxylic acids
   1.5 to 4.7 moles of primary amine-alcohol
   1 to 2.4 moles of polyhydric alcohol
   up to 0.6 mole of primary diamino compound, where the sum of the moles of primary amine-alcohol plus twice the moles of diamino compound does not exceed 4.7
   0.05 to 0.5 mole of unsaturated monocarboxylic fatty acid.

In order to produce the hardest resinous products it is desirable to use the shorter carbon chain acids in preparing the polyester-amides; the longer carbon chain acids result in softer and more flexible resins.

The reaction to produce the polyester-amide composition may be conducted either exposed to the atmosphere or in a closed reaction vessel sparged with an inert gas, such as for example as nitrogen. The reaction is not critical as to the order in which the ingredients are admixed. It may be necessary to add some of the ingredients slowly in order that the initial reaction on contact be not too violent. After all the ingredients have been added, the reaction mixture may be heated at a rate to reach a temperature of from 140° C. to 210° C. in about one hour. However, the rate of heating ordinarily is preferably conducted more slowly with batches of 25 gallons and larger. For example, in a large reaction vessel, we have taken as much as 10 hours to reach a temperature of 145° C. Good results have been attained when the rate of heating was such as to reach a temperature of 160° C. in the reaction vessel in six hours. Since the size of the reaction vessel, heating and cooling facilities, and other factors vary so much, no precise rule can be given for the rate of temperature rise. However, it is desirable that the maximum temperatures attained during reaction be within the range of 140° C. to 210° C. and the reaction continued at this temperature for a sufficient length of time to cause resinification to the point that the reaction product has a ball and ring temperature of not over 90° C.

In a separate reaction vessel there is prepared a resinous epoxide by heating a mixture having a ratio of 1 mole of a dihydric phenol and from 1 to 2 moles of halohydrin. The reaction is preferably continued in the presence of caustic alkali equal to or somewhat in excess of the amount required to combine with the halogen of the halohydrin to give complex polymeric products containing terminal epoxy and terminal hydroxyl groups. Examples of suitable dihydric phenols are 4,4′-dihydroxy diphenyl-2,2-propane (known as bisphenol A), p,p′-dihydroxydiphenyl, resorcinol, hydroquinone and condensation products of a monohydric phenyl such as cresol or hydroxybenzene with saturated aliphatic-, arylaliphatic-, aryl- and cycloaryl ketones. Suitable halohydrins are epichlorohydrin, epibromohydrin and epiiodohydrin, glycerol dichlorohydrin and $\beta$-methyl glycerol dichlorohydrin. The reaction of the halohydrin and the dihydric phenol is carried out in the presence of the alkaline catalyst. The reaction temperature should be kept moderate during the initial phases of the reaction, that is, not over 120° C. The alkali may be removed from the reaction product by neutralizing and washing with water and the substantially neutral resinous reaction product may then be heated at temperatures of as high as 160° C. to increase the molecular weight and viscosity of the resinous product to the desired ball and ring temperature.

The resinous epoxide composition with a ball and ring temperature of from 40° C. to 140° C. is preferably dissolved in a large excess of a solvent, such for example as cresylic acid, cresol, and liquid phenols. The solution of the resinous epoxide composition is then introduced into the reaction vessel containing the polyester-amide composition and admixed therewith by vigorous stirring. The temperature of the mixture is maintained above 100° C. in order to promote copolymerization or co-condensation. The viscosity of the copolymer will increase with such heating. The reaction is completed when a 70% solution of the copolymer in 3° meta-para-cresol has a ball and ring softening temperature of from 27° C. to 55° C. At this time the reaction vessel may be cooled and sufficient additional solvent added to provide an enamel or varnish composed of a suitable viscosity for use.

The following examples are illustrative of the preparation of the copolymer compositions:

EXAMPLE I

There was introduced into a reaction vessel, all parts being by weight:

Maleic anhydride _______________________________ 808.5
Adipic acid ____________________________________ 343.5
Glycerol (95%) _________________________________ 280.2
Ethylene diamine (79.2%) _______________________ 65.5

After thoroughly stirring these, there was added, over a period of 15 minutes, 315.9 parts of ethanolamine, and the temperature of the mixture rose to approximately 140° C. Heat was applied as required to maintain the temperature at 140° C. during the next three hours, then gradually increased to 155° C. during the succeeding three and one-half hours, with sparging with nitrogen being effected during the entire reaction. The ball and ring softening temperature of the resulting polyester-amide resin at the end of the period was 64° C. To the reaction mixture there was rapidly added 180 parts by weight of the bisphenolepichlorohydrin complex epoxide resin, described below, dissolved in 849 parts of cresol, the epoxide resin being of a ball and ring softening temperature of 70° C., prepared as described below. The mixed polyester-amide and epoxide resin was stirred continuously and heated at a gradually increasing temperature for the next seven hours until the temperature reached 177° C. and the ball and ring temperature of a 70% solution of the copolymer in meta-para-cresol was 42° C. Heating was then discontinued and 1470 parts of meta-para-cresol were added and the resin copolymer so produced was dissolved therein. Subsequently, 1795 parts of a petroleum hydrocarbon fraction solvent boiling in the range of 135° C. to 165° C. and 1795 parts of 95% ethanol were added. The resin solution resulting was of a viscosity suitable for coating copper wire in conventional wire enameling towers.

No. 13 copper wire was coated with four dips in the resin solution in a wire enameling tower having an oven maintained at 850° F. The cured resin enamel on the wire was smooth and hard, and it had a scrape test value of from 45 to 55 ounces as determined on the scrape tester described in Patent 2,372,093. The average dielectric strength of the enameled wire exceeded 4,000 volts. The enameled wire successfully passed the quick jerk and heat shock tests, and it showed high resistance to hot impregnating varnishes and varnish solvents such as toluene.

Other sizes of wire up to No. 40 were similarly coated with the enamel. Each size of enameled wire so produced had extremely high physical properties, such as high scrape test values, and fully met all of the known tests used in establishing the quality of a satisfactory enameled wire product.

Preparation of epoxide resin

Four moles of 4,4'-dihydroxy diphenyl-2,2-propane and five moles of epichlorohydrin were added to an aqueous caustic soda solution containing 6.43 moles of sodium hydroxide. The reaction mixture was heated slowly from an initial temperature of 40° C. to 100° C. in 80 minutes. Reaction was continued for one hour at a temperature of from 100° C. to 104° C. The reaction mixture was then permitted to stand until it separated into two layers. An upper aqueous layer was drawn off and discarded. The lower layer containing the resinous reaction product was first washed with water several times and the water withdrawn to remove excess caustic. Dilute acetic acid was then stirred in to neutralize unreacted caustic. Further washing in water was carried out until the washing was neutral to litmus. The product was freed from water by decantation and then heated to 150° C. to eliminate all traces of water. The heating was continued until the softening point of this resin was 70° C. as determined by the ball and ring test.

A series of modified polyester-amide resinous compositions of a ball and ring softening point of between 60° C. to 70° C. was prepared similarly to those of this Example I, with the exception that the parts of ethylene diamine used in preparing the polyester-amide resin were increased 25%, 50%, 75% and 100%, and the amount of glycerol was reduced proportionally to compensate for the added ethylene diamine. Each modification of the polyester-amide was reacted with the epoxide resin in the same proportions as in this Example I. Copper wire was enameled with each of the resulting copolymer resins and the applied enamel coating was found to be highly satisfactory. The scrape test values were found to increase with increased content of ethylene diamine.

The proportions of the reactants forming the polyester-amide reaction product of this Example I may be varied as follows:

| | Moles |
|---|---|
| Maleic anhydride | 3.8 to 4 |
| Adipic acid | 1 to 1.2 |
| Glycerol | 1.2 to 1.6 |
| Ethylene diamine | 0.3 to 0.5 |
| Monoethanolamine | 2.2 to 2.6 |

In all cases the reaction products resulted in wire enamels closely similar in their properties.

Separate lots of the polyester-amide resin of Example I of a ball and ring softening temperature of 64° C. were admixed with batches of the epoxide resin of ball and ring softening temperature of 45° C., 55° C., 65° C., 75° C., 100° C. and 130° C., all the other copolymer reaction conditions of Example I were otherwise maintained. Acceptable wire enamels were produced from each copolymer in each case. The epoxide resin of Example I of a ball and ring softening temperature of 42° C. was copolymerized with separate lots of the polyester-amide resin of Example I reacted to ball and ring softening temperatures of 35° C. to 75° C., and each produced a satisfactory wire enamel.

The copolymer resin is dissolved in solvents having a suitable boiling point and other properties for the particular application. We have found that a mixture of solvents ordinarily produces the best solutions for wire enameling applications. Thus, mixtures of cresols and hydrocarbon solvents having a boiling point ranging from 135° C. to 250° C. and monohydric alcohols such as ethanol and isopropanol give good results. In preparing wire enamels, mixtures of solvents comprising 40 to 50% by weight of a phenol such as cresol or xylenol or mixtures thereof, such as a mixture of phenol and cresol in equal parts, may be combined with one or more of the following: ethanol, propanol, monochlorobenzene, xylol, toluol, and petroleum hydrocarbon distillates boiling in the range of from 130° C. to 200° C. Solutions of the copolymer containing from 5% to 60% or more of the copolymer resin may be employed for dip coating of wire or for die extrusion applications. Coils and other electrical members may be dipped or impregnated in the compositions.

EXAMPLE II

Into a reaction kettle there was introduced:

| | Parts |
|---|---|
| Maleic anhydride | 269.5 |
| Adipic acid | 114.5 |
| 1,4-butanediol | 137.0 |
| Monoethanolamine | 105.3 |
| Ethylene diamine | 17.3 |

The monoethanolamine was added after the other four reactants had been stirred together for 15 minutes. The processing procedure of Example I was followed until the resin had a ball and ring temperature of 60° C., at which point 60 parts by weight of the epoxide resin of Example I dissolved in cresol were added. The mixed resins were further heated and reacted as in Example I to a ball and ring temperature of 45° C. A wire enamel solution was prepared by adding to the resulting copolymer meta-para-cresol, hydrocarbon solvent and 95% ethanol as in Example I. Copper wire was enameled in a tower with this composition and the resulting applied enamel coating was found to have good flexibility and was of acceptable toughness and hardness as determined by the scrape abrasion and their tests. The enamel met all requirements.

EXAMPLE III

A polyester-amide resin as in Example II was prepared with 179.8 parts of 1,6-hexane-diol replacing the 1,4-butanediol, and the process of the example was followed otherwise. A flexible enamel of good physical properties was secured.

In other formulations ethylene glycol and 1,1,1-trimethylolpropane were substituted in equivalent amounts for the 1,4-butanediol of Example II. In each case acceptable wire enamels were produced from the resulting copolymers.

EXAMPLE IV

A polyester-amide resin was prepared by reacting:

|  | Parts |
| --- | --- |
| Maleic anhydride | 269.5 |
| Diglycolic acid | 105.0 |
| 1,4-butanediol | 137.0 |
| Ethylene diamine | 17.3 |
| Monoethanolamine | 105.5 |

The reaction was carried out as in Example II including the addition of the epoxide resin to form a copolymer and the formulation of a wire enamel therefrom. Wire with the applied baked enamel had high scrape values, good flexibility and hot varnish resistance, among other properties and was acceptable.

EXAMPLE V

A polyester-amide resin was prepared by reacting the following as in Example II:

|  | Parts |
| --- | --- |
| Maleic anhydride | 269.5 |
| Diglycolic acid | 52. |
| Adipic acid | 58. |
| Glycerol (95%) | 93.4 |
| Ethylene diamine | 17.3 |
| Monoethanolamine | 105.3 |

The epoxide resin was added to this polyester-amide in the same proportions as in Example II and copolymerized, and the copolymer was dissolved in solvents to produce a wire enamel. When applied to copper wire in an enameling tower and baked, the baked enamel was tested and found to have very high scrape values, excellent electrical properties, and the properties otherwise corresponded to the product of Example I.

EXAMPLE VI

A wire enamel was prepared in which the procedure of Example I was followed but replacing 172 parts of the adipic acid therein with 139 parts of succinic acid. The resulting enamel when applied to wire and baked exhibited high scrape value, had fair flexibility and hot varnish resistance, and was an acceptable enamel insulation.

EXAMPLE VII

A wire enamel was prepared in which the reaction procedure of Example I was followed, employing the same ingredients except for replacing 140 parts of the glycerol with 126 parts of pentaerythritol. The resulting enamel applied to wire and baked had excellent hot varnish resistance, fair flexibility and scrape hardness, and was an acceptable product.

EXAMPLE VIII

A polyester-amide similar to that of Example I was prepared with the exception that half the weight of ethylene diamine in the example was employed, and urea was added in an amount equal to weight of the ethylene diamine left out. A copolymer of substantially the same ball and ring temperature as in Example I was prepared from this polyester-amide and the epoxide resin, and the copolymer was made into a wire enamel as in Example I. Baked enamel coatings on copper wire were produced from the enamel and tested. The baked enamel was of the same high quality as that of Example I.

In a second wire enamel formulation the ethylene diamine of Example I was replaced entirely with an equal weight of urea. Baked enamel coatings prepared from this formulation were very similar in physical and electrical properties to those of Example I.

EXAMPLE IX

A copolymer wire enamel similar to that of Example I was prepared from a polyester-amide resin from the following:

|  | Parts |
| --- | --- |
| Aconitic acid | 319.5 |
| Adipic acid | 114.5 |
| Glycerol (95%) | 93.4 |
| Monoethanolamine | 105.3 |
| Ethylene diamine | 17.3 |

When applied to copper wire and baked, an acceptable enamel insulation with good resistance to hot varnish was secured.

EXAMPLE X

A copolymer wire enamel corresponding to that of Example I was prepared in a similar way from a polyester-amide resin from the following:

|  | Parts |
| --- | --- |
| Maleic anhydride | 202 |
| "Carbic anhydride"[1] | 113 |
| Adipic acid | 114.5 |
| Glycerol (95%) | 93.4 |
| Ethylene diamine | 17.3 |
| Monoethanolamine | 105.3 |

[1] "Carbic anhydride" is a trade name for 3,6-endomethylene-Δ-4-tetrahydrophthalic anhydride.

Baked enamel coatings of the copolymer enamel were excellent and compared favorably to those secured with the product of Example I.

EXAMPLE XI

A copolymer wire enamel was prepared as in Example I, using however, for the unsaturated dicarboxylic acid a mixture of 404 parts of fumaric acid, and 404.5 parts of maleic anhydride in preparing the polyester-amide. Baked enamel coatings produced therefrom were of a quality as high as those of Example I.

EXAMPLE XII

A reaction vessel was charged with:

|  | Parts |
| --- | --- |
| Maleic anhydride | 189 |
| Sebacic acid | 110.6 |
| Glycerol (95%) | 62.3 |
| Monoethanolamine | 73.7 |
| Ethylene diamine | 14.9 |

After reacting as in Example I to a ball and ring temperature of 70° C., the epoxide resin was added in an amount equal to 25% of the weight of the polyester-amide resin. After copolymerizing while heating to a ball and ring temperature of 45° C., the copolymer was dissolved in a mixture of cresol and ethanol solvent. When the copolymer solution was applied to copper wire and baked, there resulted a hard tough enamel with acceptable properties.

Examples of other complex resinous epoxides that may be substituted in whole or in part for the epoxides in each of the previous Examples I to XII are as follows:

EXAMPLE XIII

There was introduced into a reaction vessel:

| | Moles |
|---|---|
| Resorcinol | 1 |
| Epichlorohydrin | 1.12 |
| Sodium hydroxide (aqueous) | 1.2 |

The reaction was carried out as set forth with respect to the epoxide resin in Example I until a resin having a softening point of 87° C. was secured.

EXAMPLE XIV

Four moles of bisphenol A were reacted with five moles of epichlorohydrin in aqueous caustic soda solution having 6.4 moles of NaOH, the temperature rising from 40° C. to 100° C. in 1⅓ hours and there maintained for an additional hour at 100° C. to 105° C. After washing and drying an epoxide resin having a softening point of 100° C. was secured.

EXAMPLE XV

A polyester-amide resin was prepared by following the procedure of Example I, substituting however, 64 parts by weight of 1,2-propylene diamine for the ethylene diamine in Example I. A wire enamel was then prepared from the resulting polyester-amide and the resinous epoxide, and applied to copper wire of size 17 A. W. G. The resulting cured insulation on the wire exhibited very similar properties to those possessed by the wire enamel composition of Example I on the same size wire.

A series of polyester-amide resins were prepared from maleic anhydride, adipic acid, glycerol, ethylene diamine and monoethanolamine, the proportions being varied to provide a 4.7%, 7.0% and 15% excess of acids over the amines and alcohols, and a 10%, 20% and 25% excess of amines and alcohols over the acids, but otherwise staying within the ranges of combination 2, set forth previously, and copolymers were made with the epoxy resin in the proportions set forth in Example I. Wire of size 17 A. W. G. was coated with each of these enamels. The 4.7 and 7.0% excess acid and the 10% and 20% excess alcohol and amine compositions produced excellent enameled wire. However the 15% excess acid and 25% excess alcohol and amine compositions were not as satisfactory on the size 17 wire. On size 24 wire, however, these two latter compositions make acceptable enamel insulation.

Figure 1:
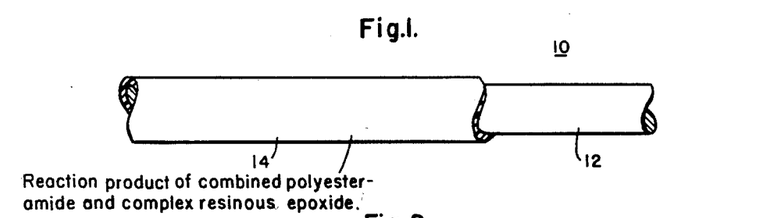
Figure 1 is a fragmentary view in elevation, partly broken, of an enameled conductor.

The resinous copolymer compositions disclosed herein may be applied to electrical conductors composed of metals such as copper, silver, steel, aluminum or the like, or to carbon or graphite members or to other materials. Referring to Fig. 1 of the drawing, there is illustrated a conductor 10 comprising a copper conductor 12 coated with the hard, tough, solid resinuous copolymer film 14 produced by applying a solution of the copolymer composition of this invention thereto and curing them by suitable baking or heat treatment. It will be understood that the coatings may be applied by any suitable means such for example as by dipping, die-coating, extrusion, or the like. After curing by baking, the resinous film 14 will be found to adhere tenaciously to the copper conductor 12. While the conductor 12 is illustrated as being of circular shape, it will be understood that it may be of any other desirable shape, such as square, rectangular or flat strip, or it may be composed of twisted or braided wire or the like. The enamel copolymer composition may have disposed therein suitable fillers, such as finely divided mica, silica, and iron oxide or coloring materials or the like.

Figure 2:
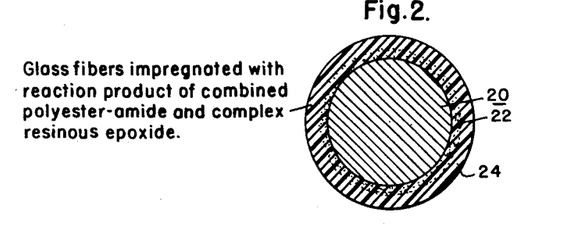
Fig. 2 is a cross-section through a conductor embodying glass fibers and the resinous compositions of the present invention.

The composition of this invention may be applied to electrical conductors such as wire, in combination with coatings of both organic and inorganic fibrous materials. One form of this modification of the invention is illustrated in Fig. 2 of the drawing showing an electrical conductor 20 of copper, for example, carrying a layer 22 of fibrous material which may be glass fibers, asbestos fibers, paper, cotton or silk or the like, either wrapped or braided or woven or various combinations thereof. The fibrous layer 22 ordinarily will be applied to the conductor 20 and the resinous copolymer compositions of this invention applied over the fibrous layer by dipping, die-coating or the like until the fibrous material is saturated and the coatings are then baked to cure the resin. It will be appreciated that the copper conductor may be pretreated with an adhesive composition in order to adhere the layer 22 thereto. Such adhesive composition may comprise an initial tacky coating of the composition of this invention or other resinous compositions such, for example, as polyvinyl alcohol, organosiloxane resins and the like.

Figure 3:
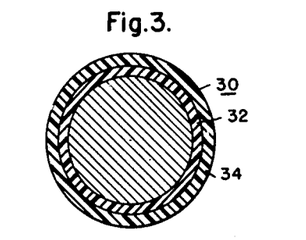
Fig. 3 is a view in cross-section showing a modified form of insulated conductor.

The resinous compositions of the present invention may be applied to wire in combination with coatings of other resinous compositions. As illustrated in Fig. 3 of the drawing, the conductor 30 may carry an initial layer 32 composed of a coating of the resinous compositions disclosed herein and a superposed coating 34 of another resin. The coating 34 may be composed of an organosiloxane resin, polyvinyl acetals, phenol formaldehyde, and other resinous compositions or admixtures thereof. In some instances, the order of application of coatings may be reversed over that shown in Fig. 3 so that the uppermost or outer coating comprises the resins of this invention and the underlying coating comprises another resin.

We have found that the cured resinous copolymer of the present invention has a high degree of thermal stability not possessed by many conventional organic resins. It is superior to phenol formaldehyde and other resins in the ability to withstand prolonged heating at elevated temperatures. If protected from oxygen the cured copolymer compositions will withstand temperatures of the order of 150° C. and even higher, for hundreds and thousands of hours with very little deterioration in toughness, hardness or other physical properties. In order to take advantage of the high thermal stability of the compositions, conductors have been prepared from the composition of the present invention with a protective covering layer of an organosiloxane resin to prevent oxygen deterioration.

Figure 4:
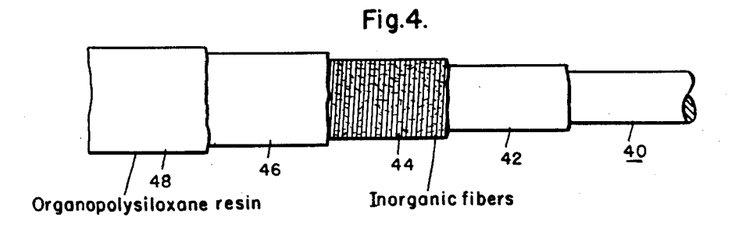
Fig. 4 is a fragmentary view in elevation, partly broken, of a still further modified form of insulated conductor.

As illustrated in Fig. 4, the conductor 40 is provided with an initial coating 42 of the copolymer resin of this invention. When initially applied the coating 42 is preferably uncured or only partly cured so that the resin is tacky. Thereafter a layer 44 of inorganic fibers such as glass fibers or asbestos fibers is placed over the tacky coating 42. The conductor is then provided with an additional coating 46 of the copolymer resin of the invention, and the conductor is then heat treated at a sufficient temperature to completely cure both the coatings 42 and 46 of the copolymer. A temperature of the order of 450° C. applied for 20 seconds to No. 18 wire is adequate. In some cases 4 or 5 dips of the copolymer enamel are applied and baked to produce the coating 46. It will be appreciated that the amount of resin in the coating 46 may be varied to meet the requirements. The coatings 42 and 46 bind the layer 44 of inorganic fibers to the conductor 40 and saturate and impregnate them thoroughly. Thereafter, an organo polysiloxane resin is applied to the conductor to provide an exterior coating 48 thereon capable of protecting the copolymer resin in the layers 42 and 46 from the effects of oxygen. Numerous organo polysiloxane resins suitable for this purpose are available; ordinarily they comprise compounds wherein hydrocarbon groups are attached to silicon. The ratio of hydrocarbon to silicon will ordinarily vary from 1:1 to 1:2, however, this ratio may vary somewhat. The organic radical attached to silicon may be phenyl and methyl which has proven to produce excellent organo polysiloxane resins for this purpose. However, the radicals attached to silicon may include other aliphatic radicals, such for example as methyl, ethyl, isopropyl, up to octadecyl and higher, alkenyl radicals such as allyl and methallyl, and aryl or alkaryl radicals such as phenol, tolyl, benzyl, naphthyl and the like. It will be appreciated that mixtures of different siloxanes may be employed. A more complete description of suitable organo siloxane resins is that set forth in application Serial No. 755,614, filed by one of the inventors of the present application.

In preparing the copolymer there may be included small amounts of additional resins as follows: Up to 7½% of cellulose acetate, up to 7½% of a phenolic resin and up to 5% of urea formaldehyde resin.

We have used cellulose acetate of a molecular weight such that a solution composed of 80% by weight of a mixture of acetone (90%) and ethanol (10%) and 20% by weight of cellulose acetate had a viscosity of 700 to 1000 centipoises, at 25° C. The cellulose acetate was dissolved in a solvent composed of a phenol to provide a 20% cellulose acetate solution by weight and this solution was admixed with a polyester-amide resin of Example I to provide 5% by weight of cellulose acetate and 95% by weight of polyester-amide resin. The resinous epoxide was then added and reacted to a copolymer as in Example I and the resulting solution was applied to copper wire and baked. The resulting cured enamel coating was of an equally high quality with that set forth in Example I.

Partially reacted phenol formaldehyde resins may be added to the copolymer. Not only can the partial reaction products of a phenol such as cresol or cresylic acid and formaldehyde, reacted in mole ratios of 1:0.9 to 1:1.7 be employed, but also partially reacted phenolic resins modified with tung oil, such as set forth in Patent 2,383,283, may be added to the copolymer composition in the proportions above indicated.

Thermosettable partially reacted urea formaldehyde compositions suitable for adding to the copolymer resins may be prepared by reacting 1 mole of urea with approximately 2 moles of formaldehyde in the presence of a monohydric alcohol such as butanol. The reaction and preparation of the urea resin is so well known that it is unnecessary to detail it here.

While the preparation of enameled wire has been emphasized, it should be understood that the copolymer compositions disclosed herein possess properties that indicate their suitability for many other applications. Sheets of metal may be coated with the copolymer compositions and they will be found useful for withstanding weathering and other conditions. Containers for handling various liquids and food products may be coated with the copolymer composition. The effect of foods, acids and other materials is negligible on the copolymer resin compositions after they have been fully cured by heat treatment. It will be further understood that protective and decorative coatings to be applied to metal, ceramics, glass, plastics, fabrics and other materials may be prepared from the copolymer compositions.

It will be understood that the term "polyester-amide of an ethylenically unsaturated dicarboxylic acid" includes the polyester-amide prepared from the anhydride, if any, of the unsaturated dicarboxylic acid.

Since certain obvious changes may be made in the above procedure and different embodiments of the invention could be made without departing from the scope thereof, it is intended that all matter contained in the above description and drawing shall be taken in connection with the accompanying claims and not in a limiting sense.

We claim as our invention:

1. An insulated conductor comprising, in combination, an electrical conductor and cured solid resinous insulation applied to the conductor, the resinous insulation comprising the copolymer of (A) from 95 to 60 parts by weight of the polyester-amide of (a) from 3 to 4.5 moles of an ethylenically unsaturated dicarboxylic acid, (b) from 0.5 to 2.0 moles of an acidic compound having no ethylenic unsaturation selected from the group consisting of aliphatic dicarboxylic acids and their anhydrides, having at least two non-carboxyl carbon atoms and having no other reactive groups than the carboxyl or anhydride groups, (c) from 1.5 to 4.7 moles of at least one primary amine alcohol selected from the group consisting of monoethanolamine and monoisopropanolamine, (d) up to 0.6 mole of at least one primary diamino compound selected from the group consisting of ethylene diamine, propylene diamine and urea, the sum of the moles of the (c) primary amine-alcohol and the (d) primary diamino compound equaling at least 2.2 and not exceeding 4.7, and (e) from 1 to 2.4 moles of at least one polyhydric alcohol, not over 75 mole percent of the polyhydric alcohol having more than three reactive hydroxyl groups, the proportions of the reactants (a), (b), (c), (d) and (e) being selected so that the carboxyl groups do not substantially exceed a 10% stoichiometric excess over the total number of hydroxy and amine groups, and the total number of hydroxy and amine groups do not substantially exceed a 20% stoichiometric excess over the number of carboxyl groups, the reactants having been admixed and heated to a temperature of at least 100° C. for a period sufficient to produce a resin of a ball and ring softening temperature of not over 90° C., and (B) from 5 to 40 parts by weight of a resinous epoxide which is the polyether derivative of a polyhydric phenol and contains an average of more than one epoxide group per molecule and is essentially free from functional groups other than the epoxy and hydroxy groups, the resinous epoxide having a ball and ring softening temperature of from 40° C. to 140° C., said copolymer having been produced by heating the mixture of (A) and (B) to react it to a ball and ring softening temperature of from 27° C. to 55° C. for a 70% solution thereof in cresol.

2. The insulated conductor of claim 1, wherein the copolymer has admixed therein cellulose acetate in an amount not exceeding 7½% of the combined weight of the (A) polyester-amide and (B) the complex resinous epoxide before application to the conductor.

3. The insulated conductor of claim 1 wherein the copolymer has admixed therein partially reacted heat hardening phenol-aldehyde resin in an amount not exceeding 7½% of the combined weight of (A) the polyester-amide and (B) the complex resinous epoxide before application to the conductor.

4. The insulated conductor of claim 1 wherein the copolymer has admixed therein partially reacted heat-hardening urea-aldehyde resin in an amount not exceeding 5% of the combined weight of (A) the polyester-amide and (B) the complex resinous epoxide before application to the conductor.

5. An insulated conductor comprising, in combination, an electrical conductor and solid resinous insulation applied to the conductor, the resinous insulation comprising a heat-treated copolymer composition of (A) from 95 to 60 parts by weight of the polyester-amide reaction product of from 3.8 to 4 moles of maleic anhydride, from 1 to 1.2 moles of adipic acid, from 1.2 to 1.6 moles of glycerol, from 2.2 to 2.6 moles of monoethanolamine, and from 0.3 to 0.5 mole of ethylene diamine, the proportions of the reactants being so selected that the amount of the maleic anhydride and adipic acid does not depart from a stoichiometric equivalent to the glycerol, monoethanolamine and ethylene diamine by more than plus 10% and minus 20%, the reactants having been admixed and reacted by heating to temperatures of from 140° C. to 210° C. to a ball and ring softening temperature of between 35° C. and 90° C., and (B) from 5 to 40 parts by weight of a complex resinous epoxide which is the polyether derivative of a polyhydric phenol containing an average of more than one epoxide group per molecule and free from functional groups other than the epoxide and hydroxy groups, the complex resinous polyepoxide having a ball and ring softening temperature of from 40° C. to 140° C., the copolymer composition having been reacted by further heating to a ball and ring softening temperature of from 27° C. to 55° C. for a 70% solution thereof in cresol before being applied to the electrical conductor.

6. An insulated conductor comprising, in combination, an electrical conductor and cured solid resinous insulation applied to the conductor, the resinous insulation comprising the copolymer of (A) from 95 to 60 parts by weight of the reaction product of from 3.0 to 4.5 moles of at least one unsaturated acidic compound selected from the group consisting of maleic acid, fumaric acid, maleic anhydride, citraconic acid and citraconic anhydride, between 0.5 and 2.0 moles of a saturated dicarboxylic aliphatic acid having from two to eight atoms linked in a straight chain between and attached to the carboxyl groups and having no other reactive group than the carboxyl groups, from 1.5 to 4.7 moles of at least one primary amine-alcohol selected from the group consisting of monoethanolamine and monoisopropanolamine, up to 0.6 mole of at least one primary diamino compound selected from the group consisting of ethylene diamine, propylene diamine and urea, the sum of the moles of primary amine-alcohol plus the moles of the primary diamino compound equaling at least 2.2 and not exceeding 4.7, and from 1 to 2.4 moles of at least one polyhydric alcohol selected from the group consisting of glycerol, pentaerythritol and paraffinic glycols having from 2 to 8 carbon atoms in a chain and no other reactive groups than the hydroxyl group, not over 75 mole percent of the polyhydric alcohol having more than 3 hydroxyl groups, the proportions of the reactants being so selected that the amount of the maleic anhydride and adipic acid does not depart from a stoichiometric equivalent to the glycerol, monoethanolamine and ethylene diamine by more than plus 10% and minus 20%, the reactants in the reaction product having been admixed and reacted by heating at temperatures of between 140° C. to 210° C. to a ball and ring softening temperature of between 35° C. and 90° C. and (B) from 5 to 40 parts by weight of a resinous epoxide which is the polyether derivative of a polyhydric phenol and contains an average of more than one epoxide group per molecule and essentially free from functional groups other than the epoxy and hydroxy groups, the resinous epoxide having a ball and ring softening temperature of from 40° C. to 140° C., the copolymer having been produced by heating the mixture of (A) and (B) to a ball and ring softening temperature of from 27° C. to 55° C. for a 70% by weight solution thereof in cresol.

7. A resinous copolymer of (A) from 95 to 60 parts by weight of the reaction product of (a) from 3 to 4.5 moles of at least one ethylenically unsaturated dicarboxylic acid, (b) from 0.5 to 2.0 moles of an acidic compound having no ethylenic unsaturation selected from the group consisting of aliphatic dicarboxylic acids and their anhydrides, having at least two non-carboxyl carbon atoms and having no other reactive groups than the carboxyl or anhydride groups, (c) from 1.5 to 4.7 moles of at least one primary amine alcohol selected from the group consisting of monoethanolamine and monoisopropanolamine, (d) up to 0.6 mole of at least one primary diamino compound selected from the group consisting of ethylene diamine, propylene diamine and urea, the sum of the moles of the (c) primary amine-alcohol and the (d) primary diamino compound equaling at least 2.2 and not exceeding 4.7, and (e) from 1 to 2.4 moles of at least one polyhydric alcohol, not over 75 mole percent of the polyhydric alcohol having more than three reactive hydroxyl groups, the proportions of the reactants (a), (b), (c), (d) and (e) being selected so that the carboxyl groups do not substantially exceed a 10% stoichiometric excess over the total number of hydroxy and amine groups, and the total number of hydroxy and amine groups do not substantially exceed a 20% stoichiometric excess over the number of carboxyl groups, the reactants having been admixed and heated to a temperature of at least 100° C. for a period sufficient to produce a resin of a ball and ring softening temperature of not over 90° C., and (B) from 5 to 40 parts by weight of a resinous epoxide which is the polyether derivative of a polyhydric phenol and contains an average of more than one epoxide group per molecule and is essentially free from functional groups other than the epoxy and hydroxy groups, the resinous epoxide having a ball and ring softening temperature of from 40° C. to 140° C., said copolymer having been prepared by heating the mixture of (A) and (B) to react it to a ball and ring softening temperature of from 27° C. to 55° C. for a 70% solution thereof in cresol.

8. A resinous composition comprising a resinous copolymer of (A) from 95 to 60 parts by weight of the reaction product of (a) from 3 to 4.5 moles of at least one ethylenically unsaturated dicarboxylic acid, (b) from 0.5 to 2.0 moles of an acidic compound having no ethylenic unsaturation selected from the group consisting of aliphatic dicarboxylic acids and their anhydrides, having at least two non-carboxyl carbon atoms and having no other reactive groups than the carboxyl or anhydride groups, (c) from 1.5 to 4.7 moles of at least one primary amine alcohol selected from the group consisting of monoethanolamine and monoisopropanolamine, (d) up to 0.6 mole of at least one primary diamino compound selected from the group consisting of ethylene diamine, propylene diamine and urea, the sum of the moles of the (c) primary amine-alcohol and the (d) primary diamino compound equaling at least 2.2 and not exceeding 4.7, and (e) from 1 to 2.4 moles of at least one polyhydric alcohol, not over 75 mole percent of the polyhydric alcohol having more than three reactive hydroxyl groups, the proportions of the reactants (a), (b), (c), (d) and (e) being selected so that the carboxyl groups do not substantially exceed a 10% stoichiometric excess over the total number of hydroxy and amine groups, and the total number of hydroxy and amine groups do not substantially exceed a 20% stoichiometric excess over the number of carboxyl groups, the reactants having been admixed and heated to a temperature of at least 100° C. for a period sufficient to produce a resin of a ball and ring softening temperature of not over 90° C. and (B) from 5 to 40 parts by weight of a resinous epoxide which is the polyether derivative of a ployhydric phenol and contains an average of more than one epoxide group per molecule and is essentially free from functional groups other than the epoxy and hydroxy groups, the resinous epoxide having a ball and ring softening temperature of from 40° C. to 140° C., said copolymer having been produced by heating the mixture of (A) and (B) to react it to a ball and ring softening temperature of from 27° C. to 55° C. for a 70% solution thereof in cresol, and a solvent for the copolymer, the solvent comprising a phenol.

9. A resinous copolymer comprising (A) from 95 to 60 parts by weight of the polyester-amide reaction product of from 3.8 to 4 moles of maleic anhydride, from 1 to 1.2 moles of adipic acid, from 1.2 to 1.6 moles of glycerol, from 2.2 to 2.6 moles of monoethanolamine, and from 0.3 to 0.5 mole of ethylene diamine, the proportions of the reactants being so selected that the amount of the maleic anhydride and adipic acid does not depart from a stoichiometric equivalent to the glycerol, monoethanolamine and ethylene diamine by more than plus 10% and minus 20%, the reactants having been admixed and reacted by heating to temperatures of from 140° C. to 210° C. to a ball and ring softening temperature of between 35° C. and 90° C., and (B) from 5 to 40 parts by weight of a complex resinous epoxide which is the polyether derivative of a polyhydric phenol containing an average of more than one epoxide group per molecule and free from functional groups other than the epoxide and hydroxy groups, the complex resinous polyepoxide having a ball and ring softening temperature of from 40° C. to 140° C. the copolymer having been produced by heating the mixture of (A) and (B) to a ball and ring softening temperature of from 27° C. to 55° C. for a 70% solution thereof in cresol.

10. A resinous copolymer comprising (A) from 95 to 60 parts by weight of the reaction product of (a) from 3.0 to 4.5 moles of at least one unsaturated acidic compound selected from the group consisting of maleic acid, fumaric acid, maleic anhydride, citraconic acid and citraconic anhydride, (b) between 0.5 and 2.0 moles of a saturated dicarboxylic aliphatic acid having from two to eight atoms linked in a straight chain between and attached to the carboxyl groups and having no other reactive group than the carboxyl groups, (c) from 1.5 to 4.7 moles of at least one primary amine-alcohol selected from the group consisting of monoethanolamine and monoisopropanolamine, (d) up to 0.6 mole of at least one primary diamino compound selected from the group consisting of ethylene diamine, propylene diamine and urea, the sum of the moles of primary amine-alcohol plus the moles of the primary diamino compound equaling at least 2.2 and not exceeding 4.7, and (e) from 1 to 2.4 moles of at least one polyhydric alcohol selected from the group consisting of glycerol, pentraerythritol and paraffinc glycols having from 2 to 8 carbon atoms in a chain and no other reactive groups than the hydroxyl group, not over 75 mole percent of the polyhydric alcohol having more than 3 hydroxyl groups, the proportions of the reactants (a), (b), (c), (d) and (e) being selected so that the carboxyl groups do not substantially exceed a 10% stoichiometric excess over the total number of hydroxy and amine groups, and the total number of hydroxy and amine groups do not substantially exceed a 20% stoichiometric excess over the number of carboxyl groups, the reactants in the reaction product having been admixed and reacted by heating at temperatures of between 140° C. to 210° C. to a ball and ring softening temperature of between 35° C. and 90° C. and (B) from 5 to 40 parts by weight of a resinous epoxide which is the polyether derivative of a polyhydric phenol and contains an average of more than one epoxide group per molecule and essentially free from functional groups other than the epoxy and hydroxy groups, the resinous epoxide having a ball and ring softening temperature of from 40° C. to 140° C., the copolymer having been produced by heating mixture of (A) and (B) to a ball and ring softening temperature of from 27° C. to 55° C. for a 70% by weight solution thereof in cresol.

11. An insulated conductor comprising, in combination, an electrical conductor and cured solid resinous insulation applied to the conductor, the resinous insulation comprising the copolymer of (A) from 95 to 60 parts by weight of the polyester-amide of (a) from 3 to 4.5 moles of an ethylenically unsaturated dicarboxylic acid, (b) from 0.5 to 2.0 moles of an acidic compound having no ethylenic unsaturation selected from the group consisting of aliphatic dicarboxylic acids and their anhydrides, having at least two non-carboxyl carbon atoms and having no other reactive groups than the carboxyl or anhydride groups, (c) from 1.5 to 4.7 moles of at least one primary amine alcohol selected from the group consisting of monoethanolamine and monoisopropanolamine, (d) up to 0.6 mole of at least one primary diamino compound selected from the group consisting of ethylene diamine, propylene diamine and urea, the sum of the moles of the (c) primary amine-alcohol and the (d) primary diamino compound equaling at least 2.2 and not exceeding 4.7, (e) from 1 to 2.4 moles of at least one polyhydric alcohol, not over 75 mole percent of the polyhydric alcohol having more than three reactive hydroxyl groups, and (f) from 0.05 to 0.5 mole of an aliphatic unsaturated monocarboxylic acid having from 16 to 18 carbon atoms in a chain terminating in the carboxyl group, the proportions of the reactants (a), (b), (c), (d), (e) and (f) being so selected that the carboxyl groups do not substantially exceed a 10% stoichiometric excess over the number of hydroxy and amine groups, and the total number of hydroxy and amine groups do not substantially exceed a 20% stoichiometric excess over the number of carboxyl groups, the reactants having been admixed and heated to a temperature of at least 100° C. for a period sufficient to produce a resin of a ball and ring softening temperature of not over 90° C., and (B) from 5 to 40 parts by weight of a resinous epoxide which is the polyether derivative of a polyhydric phenol and contains an average of more than one epoxide group per molecule and is essentially free from functional groups other than the epoxy and hydroxy groups, the resinous epoxide having a ball and ring softening temperature of from 40° C. to 140° C., said copolymer having been prepared by heating the mixture of (A) and (B) to react it to a ball and ring softening temperature of from 27° C. to 55° C. for a 70% solution thereof in cresol.

12. An insulated conductor comprising, in combination, an electrical conductor not heavier than size 24 A. W. G. and cured solid resinous insulation applied to the conductor, the resinous insulation comprising the copolymer of (A) from 95 to 60 parts by weight of the polyester-amide of (a) from 3 to 4.5 moles of an ethylenically unsaturated dicarboxylic acid, (b) from 0.5 to 2.0 moles of an acidic compound having no ethylenic unsaturation selected from the group consisting of aliphatic dicarboxylic acids and their anhydrides, having at least two non-carboxyl carbon atoms and having no other reactive groups than the carboxyl or anhydride groups, (c) from 1.5 to 4.7 moles of at least one primary amine alcohol selected from the group consisting of monoethanolamine and monoisopropanolamine, (d) up to 0.6 mole of at least one primary diamino compound selected from the group consisting of ethylene diamine, propylene diamine and urea, the sum of the moles of the (c) primary amine-alcohol and the (d) primary diamino compound equaling at least 2.2 and not exceeding 4.7, and (e) from 1 to 2.4 moles of at least one polyhydric alcohol, not over 75 mole percent of the polyhydric alcohol having more than three reactive hydroxyl groups, the proportions of the reactants (a), (b), (c), (d) and (e) being selected so that the carboxyl groups do not substantially exceed a 15% stoichiometric excess over the total number of hydroxy and amine groups, and the total number of hydroxy and amine groups do not substantially exceed a 25% stoichiometric excess over the number of carboxyl groups, the reactants having been admixed and heated to a temperature of at least 100° C. for a period sufficient to produce a resin of a ball and ring softening temperature of not over 90° C., and (B) from 5 to 40 parts by weight of a resinous epoxide which is the polyether derivative of a polyhydric phenol and contains an average of more than one epoxide group per molecule and is essentially free from functional groups other than the epoxy and hydroxy groups, the resinous epoxide having a ball and ring softening temperature of from 40° C. to 140° C., said copolymer having been produced by heating the mixture of (A) and (B) to react it to a ball and ring softening temperature of from 27° C. to 55° C. for a 70% solution thereof in cresol.

13. The resinous copolymer of claim 7 wherein at least a part of the (a) ethylenically unsaturated dicarboxylic acid is replaced by the available anhydride thereof.

14. The resinous copolymer of claim 8 wherein at least a part of the (a) ethylenically unsaturated dicarboxylic acid is replaced by the available anhydride thereof.

FRANK A. SATTLER.
JACK SWISS.
JAMES G. FORD

No references cited.